UNITED STATES PATENT OFFICE.

CHARLES CARROLL GILMAN, OF ELDORA, IOWA.

PROCESS OF PRODUCING A BUILDING MATERIAL.

SPECIFICATION forming part of Letters Patent No. 353,630, dated November 30, 1886.

Application filed December 26, 1885. Serial No. 186,794. (Specimens.)

*To all whom it may concern:*

Be it known that I, CHARLES CARROLL GIL-MAN, of Eldora, Hardin county, Iowa, have invented a new and useful Process for Producing a Building Material and a new and useful Product the Result of such Process, of which the following is a specification.

The object of my invention is to produce a material which is analogous in some respects to the well-known terra-cotta lumber heretofore patented to me, but which is less expensive to make and more useful in some of its applications. The material is prepared in a peculiar way by a treatment of clay and straw cut into short lengths. It is not entirely suitable for fireproofing, but is incombustible, and is penetrable by nails, and offers a considerable resistance to the action of fire, or fire and water combined.

In the production of terra-cotta lumber a difficulty of some moment is experienced which is due to the following cause: Clay or clay combined with vegetable matter and reduced to a plastic state by tempering with water and then pressed to form shrinks in drying and burning in about the ratio of one and one-twelfth inch to a lineal foot. This property prevents the making of bricks of this material of great length, and is likewise liable to destroy more or less of the product of the mill by reason of the shrinking in drying. The material will sometimes crack or open, and thus blocks will have to be rejected and treated over again. Practically about thirty-six inches is the utmost length of which terra-cotta lumber may be made, and even then a considerable loss results in the treatment. By the improved process which I have invented a material of much greater length can be treated, even as long as ten or twelve feet.

In carrying out my invention practically I proceed as follows: I provide a clay which may be of almost any of the well-known varieties, and even a considerable percentage of loam will not prevent the useful result if the clay itself be strong. This clay I pass through or between heavy iron crushers set close enough to break up the lumps or intermingled stones. These crushers may be of the rolled form or other construction. If the clay be damp, as it usually is, it emerges from the crushers in a caked form. These cakes must be broken up and pulverized finely. I prefer to use the disintegrator patented to Clayton Potts and Albert Potts, No. 322,393, on the 14th day of July, 1885.
The clay so prepared is evenly spread over a floor, preferably of cement, of the depth, say, of three inches, and next to and on top of this layer is applied one of equal depth, or somewhat greater, of straw, hay, weeds, or the like, chopped into lengths preferably between one-half an inch and two inches. In some cases I may add sawdust to the straw, though I prefer not. I prefer to prepare the vegetable fiber by a cutting-machine like that patented to Elmore W. Ross on the 23d day of October, 1883, No. 287,392. The layer of straw should be liberally sprinkled with water, and the layer of clay likewise, if that be dry. I then place upon the pile a second layer of prepared clay of the same thickness and in the same manner as previously described, and then again a layer of straw, such alternate layers being applied as first described until the entire pile is from four to six feet thick. The pile as completed should then be covered with dampened blankets or bagging to prevent evaporation, and suffered to stand until the moisture becomes uniformly distributed throughout the mass. When this condition is attained, workmen stationed at one end of the pile with sharpened shovels slice it down from top to bottom and shovel it forward to the press, agitating the mixture violently up and down during its passage to insure a thorough intermingling of the ingredients therewith. This operation must not, however, be continued too long, as the straw, being much lighter than the clay, has a tendency to work itself upward and separate from the clay. I can accomplish the same result by piling the clay and vegetable matter alternately, as described, into tempering-pits and working the same together with a pulverizing-wheel, as practiced in tempering clay for brick-making; but drainage in this case must be provided for in the bottom of the pit, to allow the superfluous water added during the operation to give plasticity to pass away. The material so prepared is then shoveled into a press cylindrical in form, tapering from the receiving to the delivering end, and in general shape not unlike a cannon in horizontal position. At the smaller end dies of any form may be attached. The clay mixture is propelled through this press by a feeding-screw, sometimes known as an "auger." The machine I prefer is that manufactured by the Michigan Brick and Tile Machine Works, whose place of business is at Morenci, Michigan. As the stream of material is propelled through the dies upon the table beyond, it has, in consequence of the great pressure exerted by the press, assumed a very condensed condition, and is solid enough to be removed to the drying-room after cutting into the required lengths without the necessity of the use of boards to support the material. The cutting off of the blocks must be done with a buzz or hand saw, the vegetable matter having assumed under the treatment described a longitudinal position and become a fibrous mass so densely packed as to forbid its being cut with a wire or knife, as practiced with the sawdust mixture. In drying no tendency to warp or part by reason of shrinkage is observable.

The material may be burned in any suitable kiln. The common updraft kiln of the brickmaker is preferable.

The especial advantages of this material are its cheapness of manufacture, and the fact that it may be made in long lengths with little loss occurring in such manufacture from breakage by reason of handling or shrinking when in an unburned state, and the fact that when completed it possesses a strength remarkable for this class of material. These advantages seem to me to be largely due to the fact that the straw in the compound, by reason of friction encountered in its passage through the press and die, becomes so arranged that its fibers lie parallel with each other and with the axis of the material as it is delivered from the press. Of course not all the fibers become exactly parallel with such axis; but a large proportion of them are so arranged. The peculiar screw action of the press upon the mixture presented largely contributes to accomplish this result, and therein consists one of the especial novelties of my invention.

What I claim as my invention, and desire to secure by Letters Patent, is—

1. That improvement in the art of making porous earthenware which consists in mixing clay with fibrous vegetable matter cut in lengths, substantially as described, expressing the mixture through a press of expression, so as to cause the lengths of vegetable matter to arrange themselves parallel to the length of the material, and, subsequently to drying, burning the same, substantially as described.

2. That step in the process of making porous earthenware which consists in mixing with clay a sufficient quantity of straw or equivalent fibrous vegetable matter cut into lengths, substantially as described, for the purpose of preventing the cracking and shrinking apart in drying, substantially as set forth.

3. A porous earthenware product characterized by longitudinal pores, cells, or holes formed by the burning out of imprisoned fibrous vegetable matter, substantially as described.

CHARLES CARROLL GILMAN.

Witnesses:
GEO. H. EVANS,
WM. A. POLLOCK.